US011434823B2

(12) United States Patent
Roberge

(10) Patent No.: US 11,434,823 B2
(45) Date of Patent: Sep. 6, 2022

(54) SYSTEMS AND METHODS FOR POWER TRANSFER IN CRYOGENIC FUEL APPLICATIONS

(71) Applicant: UNITED TECHNOLOGIES CORPORATION, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 383 days.

(21) Appl. No.: 16/734,925

(22) Filed: Jan. 6, 2020

(65) Prior Publication Data

US 2021/0207537 A1 Jul. 8, 2021

(51) Int. Cl.
| | |
|---|---|
| F02C 7/22 | (2006.01) |
| F02C 3/22 | (2006.01) |
| F04B 15/08 | (2006.01) |
| F02C 7/224 | (2006.01) |
| F02C 9/30 | (2006.01) |
| F04B 9/113 | (2006.01) |

(52) U.S. Cl.
CPC ............... *F02C 7/22* (2013.01); *F02C 3/22* (2013.01); *F02C 7/224* (2013.01); *F02C 9/30* (2013.01); *F04B 9/113* (2013.01); *F04B 15/08* (2013.01); *F04B 2203/0903* (2013.01)

(58) Field of Classification Search
CPC .. F02C 7/22; F02C 7/224; F02C 7/232; F02C 9/30; F02C 9/48; F02C 9/40
See application file for complete search history.

(56) References Cited

U.S. PATENT DOCUMENTS

| 5,161,365 A | 11/1992 | Wright |
| 8,684,304 B2 | 4/2014 | Burns et al. |
| 8,727,270 B2 | 5/2014 | Burns et al. |
| 9,908,635 B2 | 3/2018 | Snyder |
| 10,125,692 B2 * | 11/2018 | Ernst ........................ F02C 9/28 |
| 2016/0025339 A1 | 1/2016 | Kamath et al. |
| 2016/0123226 A1 * | 5/2016 | Razak ...................... F02C 7/18 |
| | | 60/39.15 |

(Continued)

FOREIGN PATENT DOCUMENTS

GB 1499205 1/1978

OTHER PUBLICATIONS

Baelz North America. 2-Way vs 3-Way Valves: Which Type is Right for You? Oct. 10, 2018 (Year: 2018).*

(Continued)

*Primary Examiner* — Carlos A Rivera
*Assistant Examiner* — Jingchen Liu
(74) *Attorney, Agent, or Firm* — Snell & Wilmer L.L.P.

(57) ABSTRACT

A fuel power transfer system for an engine may include a cryogenic fuel supply, a fuel pump in fluid communication with the cryogenic fuel supply, a multi-position valve in fluid communication with the fuel pump and a combustion chamber of the engine, a fuel turbine operatively coupled to the fuel pump and having a primary discharge port in fluid communication with the combustion chamber, a primary heat exchanger in fluid communication between the multi-position valve and the fuel turbine, and a gearbox operatively coupled to the fuel turbine and the fuel pump and configured to transfer power from the fuel turbine to the engine.

10 Claims, 4 Drawing Sheets

(56) References Cited

U.S. PATENT DOCUMENTS

2021/0293182 A1\* 9/2021 Nako ........................ F02C 7/26

OTHER PUBLICATIONS

European Patent Office, European Search Report dated Sep. 7, 2021 in Application No. 21150109.3.
European Patent Office, European Partial Search Report dated Jun. 7, 2021 in Application No. 21150109.3.

\* cited by examiner

SYSTEMS AND METHODS FOR POWER TRANSFER IN CRYOGENIC FUEL APPLICATIONS

FIELD

The present disclosure relates generally to aircraft systems and, more particularly, to aircraft power plant and auxiliary systems.

BACKGROUND

It has been proposed to operate gas turbine engines, such as those used to propel aircraft, by using more than one type of fuel. Such fuels may be used together simultaneously or selectively during differing periods of operation. In such regimes, it is usual to use a conventional fuel such as, for example, kerosene as the primary fuel and a secondary fuel such as a cryogenic liquid fuel. The secondary fuel may be burned to power the engine either simultaneously with the primary fuel or as a substitute during certain periods of engine operation. Operating engines with blended traditional and cryogenic fuels may tend to enhance engine performance.

SUMMARY

In various embodiments, a fuel power transfer system for an engine comprises a cryogenic fuel supply, a fuel pump in fluid communication with the cryogenic fuel supply, a multi-position valve in fluid communication with the fuel pump and a combustion chamber of the engine, a fuel turbine operatively coupled to the fuel pump and having a primary discharge port in fluid communication with the combustion chamber, a primary heat exchanger in fluid communication between the multi-position valve and the fuel turbine, and a gearbox operatively coupled to the fuel turbine and the fuel pump and configured to transfer power from the fuel turbine to the engine.

In various embodiments, a motor-generator may be operatively coupled to the gearbox and selectively configurable to operate as a motor or a generator. In various embodiments, an auxiliary heat exchanger may be in fluid communication between the multi-position valve and the combustion chamber. In various embodiments, the fuel pump and the fuel turbine are operatively coupled via a common shaft. In various embodiments, the motor-generator is coupled to the gearbox via an accessory clutch and wherein the gearbox is configured to transfer power from the fuel turbine to the engine via a power transfer clutch. In various embodiments, the system further comprises a controller, a sensor in communication with the controller and configured to provide sensor feedback and a tangible, non-transitory memory configured to communicate with the controller, the tangible, non-transitory memory having instructions stored thereon that, in response to execution by the controller, cause the controller to perform operations comprising, determining a startup condition, controlling the motor-generator in response to the startup condition, controlling the multi-position valve in response to the startup condition, and controlling the accessory clutch in response to the startup condition.

In various embodiments, the operations further comprise determining an auxiliary heat condition and controlling the multi-position valve to direct a portion of the fuel to an auxiliary heat exchanger in fluid communication with the combustion chamber in response to the auxiliary heat condition. In various embodiments, the operations further comprise determining an operating power condition, controlling the multi-position valve in response to the operating power condition, and controlling at least one of the accessory clutch or the power transfer clutch in response to the operating power condition.

In various embodiments, the system comprises a primary turbine discharge valve configured to be controlled by the controller and in fluid communication between the combustion chamber and the primary discharge port, and a secondary turbine discharge valve configured to be controlled by the controller and in fluid communication between the combustion chamber and a secondary discharge port of the fuel turbine, wherein each of the primary turbine discharge valve and the secondary turbine discharge valve are configured to interrupt fluid communication with the combustion chamber. In various embodiments, the operations further comprise determining an intermediate operating power condition, controlling at least one of the accessory clutch or the power transfer clutch in response to the intermediate operating power condition, and controlling at least one of the primary turbine discharge valve or the secondary turbine discharge valve in response to the intermediate operating power condition.

In various embodiments, the operations further comprise selecting a motor mode of the motor generator in response to the startup condition, selecting a generator mode of the motor generator in response to the operating power condition, and controlling an electrical load disconnect relay in response to the operating power condition. In various embodiments, the sensor includes a first fuel pressure sensor in fluid communication with the primary discharge port and a second fuel pressure sensor in fluid communication with the secondary discharge port, wherein the operations further comprise receiving a primary discharge port pressure and a secondary discharge port pressure, and determining the operating power condition or the intermediate operating power condition based on the primary discharge port pressure and the secondary discharge port pressure.

In various embodiments, a method of controlling a fuel power transfer system for an engine comprises determining a startup condition, controlling a motor-generator in response to the startup condition, controlling a multi-position valve in response to the startup condition, and controlling an accessory clutch in response to the startup condition.

In various embodiments, the method includes determining an auxiliary heat condition and controlling the multi-position valve to direct a portion of a fuel to an auxiliary heat exchanger in fluid communication with a combustion chamber of the engine in response to the auxiliary heat condition. In various embodiments, the method includes determining an operating power condition, controlling the multi-position valve in response to the operating power condition, and controlling at least one of the accessory clutch or the power transfer clutch in response to the operating power condition. In various embodiments, the method includes determining an intermediate operating power condition, controlling at least one of the accessory clutch or the power transfer clutch in response to the intermediate operating power condition, and controlling at least one of the primary turbine discharge valve or the secondary turbine discharge valve in response to the intermediate operating power condition.

In various embodiments, an article of manufacture is provided. The article of manufacture may include a tangible, non-transitory computer-readable storage medium having instructions stored thereon that, in response to execution by a processor, cause the processor to perform operations comprising determining a startup condition, controlling a motor-generator in response to the startup condition, controlling a multi-position valve in response to the startup condition, and controlling an accessory clutch in response to the startup condition.

In various embodiments, the operations include determining an operating power condition, controlling the multi-position valve in response to the operating power condition, and controlling at least one of the accessory clutch or the power transfer clutch in response to the operating power condition. In various embodiments, the operations include determining an intermediate operating power condition, controlling at least one of the accessory clutch or the power transfer clutch in response to the intermediate operating power condition, and controlling at least one of the primary turbine discharge valve or the secondary turbine discharge valve in response to the intermediate operating power condition. In various embodiments, the operation further comprise operations further comprise selecting a motor mode of the motor generator in response to the startup condition, selecting a generator mode of the motor generator in response to the operating power condition, and controlling an electrical load disconnect relay in response to the operating power condition.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
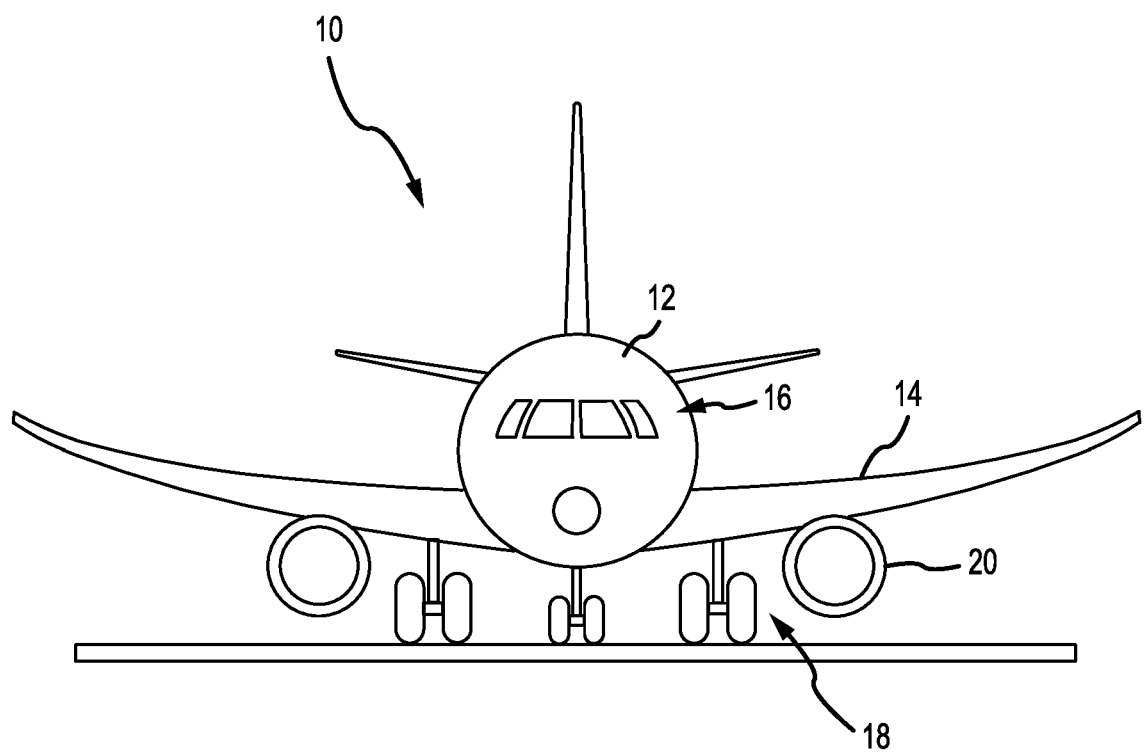
FIG. 1A illustrates an exemplary aircraft, in accordance with various embodiments.
Figure 1A:
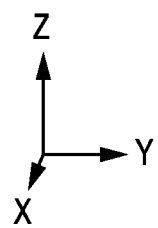

With reference to FIG. 1A, an aircraft 10 is illustrated in accordance with various embodiments. Aircraft 10 comprises a fuselage 12, wings 14, cockpit controls 16, landing gear 18, and a propulsion system, such as gas turbine engines 20. In various embodiments, aircraft 10 may include a fuel and power transfer system 200.

Figure 1B:
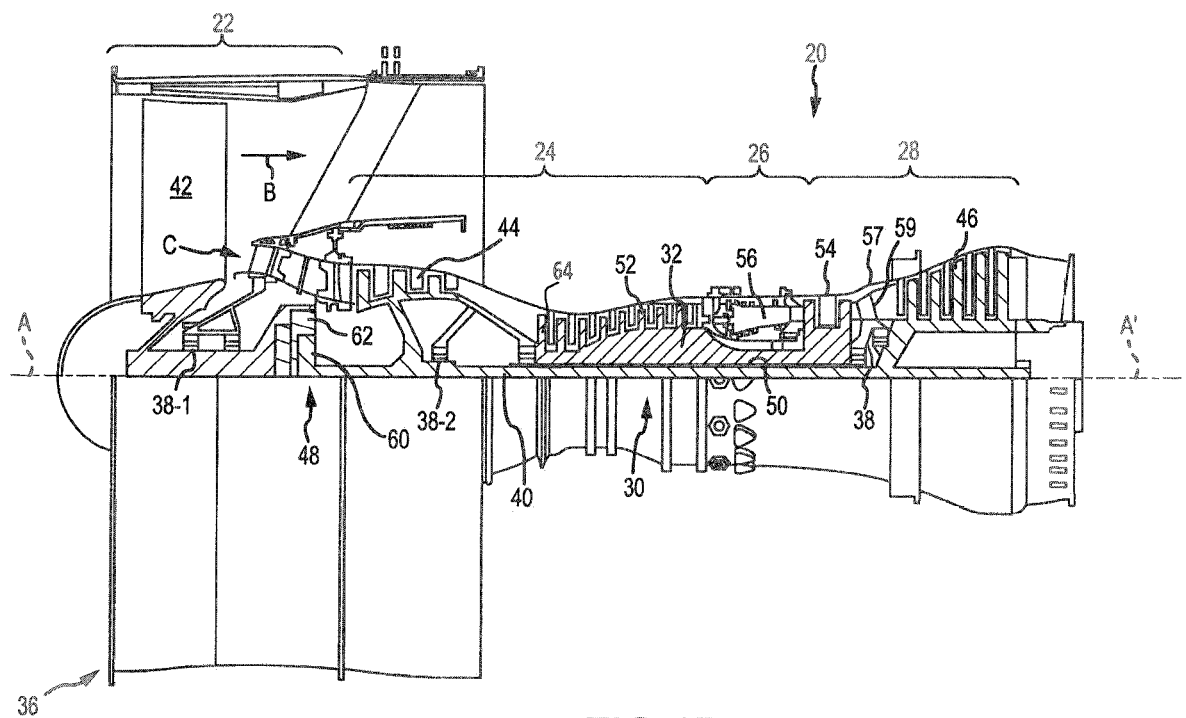
FIG. 1B illustrates an exemplary gas turbine engine, in accordance with various embodiments.

In various embodiments and with reference to FIG. 1B, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air through a core flow-path C for compression and communication into combustor section 26 then expansion through turbine section 28. In various embodiments, gas turbine engine 20 may incorporate a plurality of engine accessories such as, for example, components of power transfer system 200. Although depicted as a turbofan gas turbine engine 20 herein, it should be understood that the concepts described herein are not limited to use with turbofans as the teachings may be applied to other types of engines including turbojet engines, a low-bypass turbofans, a high bypass turbofans, reciprocating engines, or any other internal combustion engine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
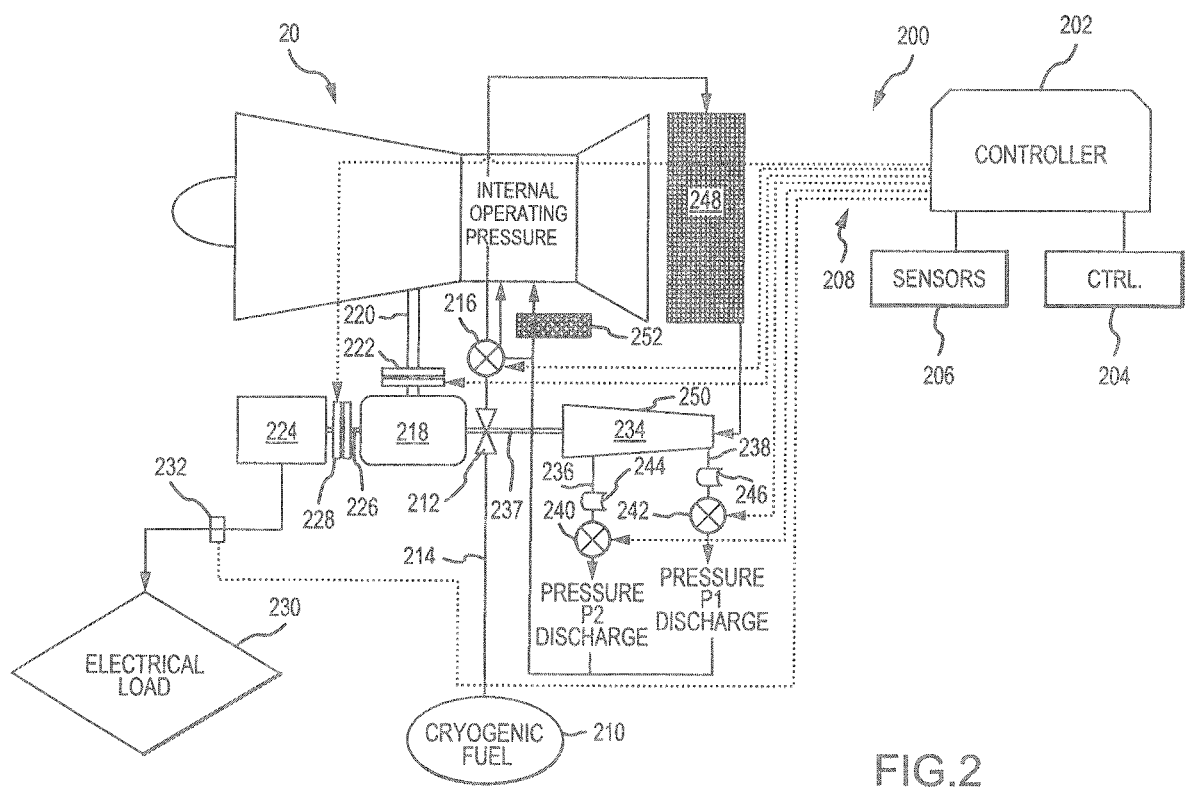
FIG. 2 illustrates a fuel and power transfer system, in accordance with various embodiments.

With additional reference to FIG. 2, system 200 is shown integrated with the gas turbine engine 20 of aircraft 10 according to various embodiments. System 200 includes a controller 202 which may be integrated into computer systems onboard aircraft 10. In various embodiments, controller 202 may be configured as a central network element or hub to access various systems, engines, and components of system 200. Controller 202 may comprise a network, computer-based system, and/or software components configured to provide an access point to various systems, engines, and components of system 200. In various embodiments, controller 202 may comprise a processor. In various embodiments, controller 202 may be implemented in a single processor. In various embodiments, controller 202 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 202 may comprise a processor configured to implement various logical operations in response to execution of instructions, for example, instructions stored on a non-transitory, tangible, computer-readable medium configured to communicate with controller 202. In this regard, controller 202 may be configured to control various components of system 200 via control signals 208.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se and includes all standard computer-readable media that are not only propagating transitory signals per se.

In various embodiments, controller 202 may be in electronic communication with a pilot through a control interface 204 of cockpit controls 16, for example, a multifunction display, a switch panel, and/or the like which an operator can operate. The control interface 204 may enable the operator to interact with system 200 for example, to issue commands, display information such as, for example, warnings, or receive outputs. Control interface 204 may comprise any suitable combination of hardware, software, and/or database components.

System 200 comprises one or more feedback elements to monitor and measure aircraft 10 and gas turbine engine 20 characteristics. For example, controller 202 is in electronic communication with sensors 206 that may be coupled to or in direct electronic communication with aircraft systems such as, for example, propulsion systems, fuel systems (e.g., primary and secondary fuel systems), and/or the like. Controller 202 may be in electronic communication with the full suite of aircraft sensors and other data sources available within and without the aircraft 10. Sensors 206 may comprise a temperature sensor, a torque sensor, a speed sensor, a pressure sensor, a position sensor, an accelerometer, a voltmeter, an ammeter, a wattmeter, an optical sensor, or any other suitable measuring device known to those skilled in the art. Sensors 206 may be configured to transmit measurements to controller 202, thereby providing sensor feedback about the measured system. The sensor feedback may be, for example, a speed signal, or may be position feedback, temperature feedback, pressure feedback or other data.

System 200 includes a cryogenic fuel supply 210 which may be configured to store a fuel such as a cryogenic liquid fuel. In various embodiments, the fuel may be one of molecular hydrogen, methane, ethane, propane, butane, natural gas and/or the like. The cryogenic fuel supply 210 is in fluid communication with a fuel pump 212 via supply line 214. The fuel pump 212 is configured to increase the pressure of the fuel (such as, for example, above a critical pressure of the fuel) and supply the fuel at an increased pressure to a multi-position valve 216. In various embodiments, the fuel pump 212 is coupled to a gearbox 218 and receives operative power therefrom such as, for example, via a pump shaft.

In various embodiments, gearbox 218 may receive operative power from the gas turbine engine 20. For example, in various embodiments, gearbox 218 may be coupled to any of the spools (e.g., 30, 32) and/or shafts (e.g., 40, 50) of gas turbine engine 20 by a power transfer shaft 220. The power transfer shaft 220 may be coupled to the gearbox 218 through a power transfer clutch 222. In this regard, the gearbox 218 may be selectively mechanically coupled to the gas turbine engine 20 and thereby configured to transmit to or receive power from the gas turbine engine 20.

In various embodiments and in like regard, gearbox 218 may be mechanically coupled to a motor-generator 224 via accessory shaft 226 and accessory clutch 228. Motor-generator 224 may be selectively operable as a motor or as a generator. In this regard, in motor operation, motor-generator 224 may be configured to provide operative power to the fuel pump 212 via the gearbox 218 by engaging the accessory clutch 228. Similarly, motor-generator 224 may be configured to provide operative power to the gas turbine engine 20 via the gearbox 218 by engaging the accessory clutch 228 and the power transfer clutch 222. Motor-generator 224 may be coupled to an electrical load 230 such as, for example, an electrical power system of aircraft 10. When configured to operate as a generator, motor-generator 224 may supply electrical power to the electrical load 230 in response to receiving operative power from the gearbox 218. In various embodiments, the electrical load 230 may be disconnected from the motor-generator 224 by, for example, an electrical load disconnect relay 232.

In various embodiments, a fuel turbine 234 may be operatively coupled to the fuel pump 212 and/or the gearbox 218 such as, for example, via a common shaft 237. In various embodiments, the fuel turbine 234 may provide input to the gearbox 218 and subsequently drive the fuel pump 212 and motor-generator 224 via geared shafting configured to provide desired rotational speeds for each component. The fuel turbine 234 may be a variable pressure discharge turbine and may include a primary discharge port 236 (i.e., a first discharge port) and a secondary discharge port 238 (i.e., a second discharge port) in fluid communication with a combustion chamber of the gas turbine engine 20 (e.g., combustor 56). In various embodiments, each discharge port of the fuel turbine 234 may be in fluid communication with a respective control valve configured to regulate and/or interrupt fluid communication with the combustion chamber. For example, a primary turbine discharge valve 240 and a secondary turbine discharge valve 242 (i.e., a first valve and a second valve) may be coupled to the respective discharge port of the fuel turbine 234. In various embodiments, sensors 206 may include a first fuel pressure sensor 244 may be in fluid communication with the primary discharge port 236 and a second fuel pressure sensor 246 may be in fluid communication with the secondary discharge port 238.

In various embodiments, multi-position valve 216 may be in fluid communication with a primary heat exchanger 248. The multi-position valve 216 may be configured to send a portion of the fuel from fuel pump 212 through the primary heat exchanger 248. The primary heat exchanger 248 may extract heat from the gas turbine engine 20 and impart heat energy to the fuel. In this regard, the primary heat exchanger 248 may be configured to vaporize and expand the fuel and deliver heated gaseous fuel to the inlet 250 of the fuel turbine 234. It will be appreciated that fuel serves as a working fluid for the fuel turbine 234 which may thereby extract energy from the working fluid to drive loads such as the fuel pump 212, gearbox 218, motor-generator 224, and power transfer shaft 220 and that these loads may be modulated (e.g., by commands from controller 202) via clutches 222 and 228. The heated gaseous fuel may be further expanded by the fuel turbine 234 and may be directed to the combustion chamber via the primary discharge port 236 and/or the secondary discharge port 238.

In various embodiments, multi-position valve 216 may be in fluid communication with an auxiliary heat exchanger 252 in fluid communication with the combustion chamber. The multi-position valve 216 may be selectively configurable to direct a portion or an entirety of the fuel pump 212 fuel output directly to any of the combustion chamber, the auxiliary heat exchanger 252, or the primary heat exchanger 248. In various embodiments, the auxiliary heat exchanger 252 may be in fluid communication with the primary turbine discharge valve 240 and/or the secondary turbine discharge valve 242. In this regard, by selecting a position of the multi-position valve in response to a startup condition, the auxiliary heat exchanger 252 may be configured to preheat fuel from the fuel pump 212 to a gaseous state during the startup condition prior to introduction to the combustion chamber. In like regard, by selecting a position of the multi-position valve in response to an operating power condition, the auxiliary heat exchanger 252 may be configured to reheat the expanded gaseous fuel from either of the primary discharge port 236 and/or the secondary discharge port 238 prior to introduction to the combustion chamber during the operating power condition.

Figure 3:
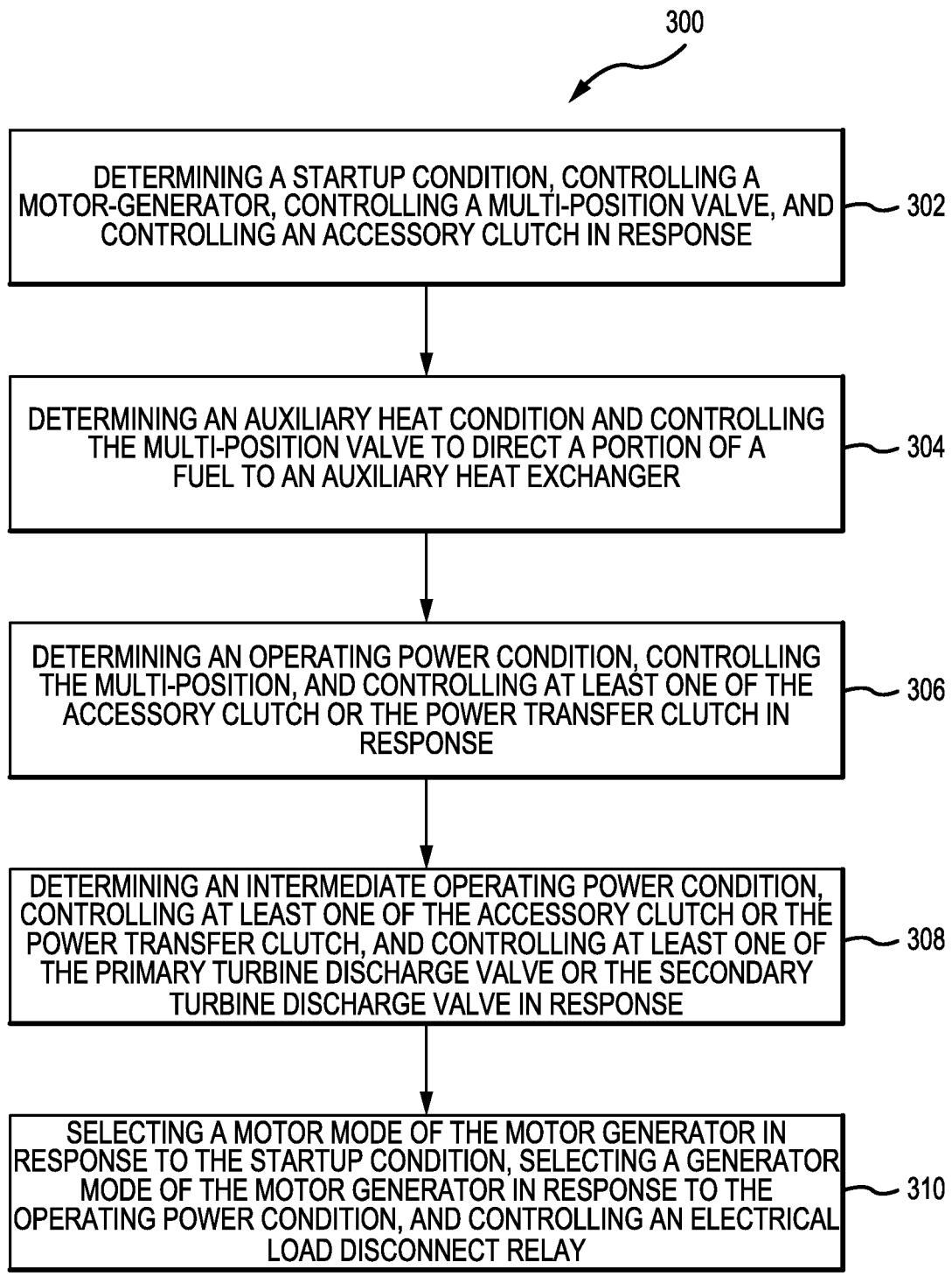
FIG. 3 illustrates a method of controlling a fuel power transfer system.

With additional reference to FIG. 3, a method 300 of controlling a fuel and power transfer system is illustrated according to various embodiments. Method 300 comprises determining a startup condition, controlling a motor-generator in response to the startup condition, controlling a multi-position valve in response to the startup condition, and controlling an accessory clutch in response to the startup condition (step 302). For example, controller 202 may determine a startup condition in response to an input from control interface 204 such as an engine start command. The controller 202 may command the accessory clutch 228 to engage and may select a motor mode of the motor-generator 224. In this regard, controller 202 may provide operative force to the fuel pump 212 via gearbox 218. Stated another way, the controller 202 may control and/or configure the multi-position valve 216 to enable fluid communication between the fuel pump 212 and the combustion chamber but bypass the primary heat exchanger 248 in response to the startup condition.

In various embodiments, method 300 includes controller 202 determining an auxiliary heat condition and controlling the multi-position valve 216 to direct a portion of a fuel to the auxiliary heat exchanger 252 (step 304). Method 300 includes determining an operating power condition, controlling the multi-position valve in response to the operating power condition, and controlling at least one of the accessory clutch or the power transfer clutch in response to the operating power condition (step 306). In various embodiments, method 300 includes determining an intermediate operating power condition, controlling at least one of the accessory clutch or the power transfer clutch in response to the intermediate operating power condition, and controlling at least one of the primary turbine discharge valve or the secondary turbine discharge valve in response to the intermediate operating power condition (step 308). In various embodiments, the controller 202 may determine the intermediate operating condition based on a power setting of the turbine engine 20 such as, for example, a cruise power setting which may be entered via the control interface 204. The intermediate operating condition may be determined based on sensors 206 measurements such as, for example, measurements at a P3 (e.g., a combustor inlet pressure) station of the turbine engine 20 or a fuel pressure measurement. In like regard, an operating power condition may be determined where the measurements are relatively greater than that of the intermediate operating condition such as, for example, a full power setting which may be entered via the control interface 204. In various embodiments, method 300 includes comprise selecting a motor mode of the motor generator in response to the startup condition, selecting a generator mode of the motor generator in response to the operating power condition, and controlling an electrical load disconnect relay in response to the operating power condition (step 310).

For example, controller 202 may determine an operating power condition or an intermediate operating power condition of gas turbine engine 20 such as, for example, based on sensor data from sensors 206 or in response to a power setting command from control interface 204. The controller 202 may receive a primary discharge port pressure from the first fuel pressure sensor 244 may a secondary discharge port pressure from the second fuel pressure sensor 246. In this regard, the controller 202 may determine the operating power condition or the intermediate operating power condition based on the primary discharge port pressure and the secondary discharge port pressure.

Controller 202 may control the multi-position valve 216 to enable fluid communication between the fuel pump 212, the primary heat exchanger 248, and the inlet 250 of the fuel turbine 234. The controller 202 may command accessory clutch 228 to engage and may command the power transfer clutch 222 to engage. The controller 202 may select a generator mode of the motor-generator 224 and may command the electrical load disconnect relay 232 to close and thereby enable electronic communication between the electrical load 230 and the motor-generator 224. In this regard, the controller 202 may configure the fuel turbine 234 to transmit power to the gearbox 218 and thereby transfer power between the gas turbine engine 20 and the electrical load 230.

In various embodiments controller 202 may determine an intermediate operating power condition in response to an intermediate power setting from the control interface 204 or in response to sensor 206 data such as gas turbine engine 20 station temperatures, rotor speeds, internal pressures, inlet 250 temperature, the fuel turbine discharge port pressures and/or the like. The controller 202 may control or module each of the primary turbine discharge valve 240 and a secondary turbine discharge valve 242 in response to the intermediate power condition. The controller 202 may command the power transfer clutch to disengage. In this regard, controller 202 may control the fuel turbine 234 discharge pressure to remain above the combustion chamber operating pressure and thereby tend to inhibit back driving of the fuel turbine 234 by the gas turbine engine 20.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fuel power transfer system for an engine, comprising:
a cryogenic fuel supply;
a fuel pump in fluid communication with the cryogenic fuel supply;
a multi-position valve in fluid communication with the fuel pump and a combustion chamber of the engine;
a fuel turbine operatively coupled to the fuel pump and having a first discharge port in fluid communication with the combustion chamber;

a primary heat exchanger in fluid communication between the multi-position valve and the fuel turbine;

a gearbox operatively coupled to the fuel turbine and the fuel pump and configured to transfer power from the fuel turbine to the engine; and a motor-generator operatively coupled to the gearbox and selectively configurable to operate as a motor or a generator, wherein the motor-generator is coupled to the gearbox via a first clutch, and the gearbox is configured to transfer power from the fuel turbine to the engine via a second clutch.

2. The fuel power transfer system of claim 1, further comprising an auxiliary heat exchanger in fluid communication between the multi-position valve and the combustion chamber.

3. The fuel power transfer system of claim 1, wherein the fuel pump and the fuel turbine are operatively coupled via a common shaft.

4. The fuel power transfer system of claim 1, further comprising:

a controller;

a sensor in communication with the controller and configured to provide sensor feedback; and a tangible, non-transitory memory configured to communicate with the controller, the tangible, non-transitory memory having instructions stored thereon that, in response to execution by the controller, cause the controller to perform operations comprising:

determining, by the controller, a startup condition;

controlling, by the controller, the motor-generator in response to the startup condition;

controlling, by the controller, the multi-position valve in response to the startup condition; and controlling, by the controller, the first clutch in response to the startup condition.

5. The fuel power transfer system of claim 4, wherein the operations further comprise:

determining, by the controller, an auxiliary heat condition; and controlling, by the controller, the multi-position valve to direct a portion of the cryogenic fuel supply to an auxiliary heat exchanger in fluid communication with the combustion chamber in response to the auxiliary heat condition.

6. The fuel power transfer system of claim 4, wherein the operations further comprise:

determining, by the controller, an operating power condition;

controlling, by the controller, the multi-position valve in response to the operating power condition; and controlling, by the controller, at least one of the first clutch or the second clutch in response to the operating power condition.

7. The fuel power transfer system of claim 4, further comprising:

a first turbine discharge valve configured to be controlled by the controller and in fluid communication between the combustion chamber and the first discharge port; and a second turbine discharge valve configured to be controlled by the controller and in fluid communication between the combustion chamber and a second discharge port of the fuel turbine, wherein each of the first turbine discharge valve and the second turbine discharge valve are configured to interrupt fluid communication with the combustion chamber.

8. The fuel power transfer system of claim 7, wherein the operations further comprise:

determining, by the controller, an intermediate operating power condition;

controlling, by the controller, at least one of the first clutch or the second clutch in response to the intermediate operating power condition; and controlling, by the controller, at least one of the first turbine discharge valve or the second turbine discharge valve in response to the intermediate operating power condition.

9. The fuel power transfer system of claim 6, wherein the operations further comprise:

selecting, by the controller, a motor mode of the motor-generator in response to the startup condition;

selecting, by the controller, a generator mode of the motor-generator in response to the operating power condition; and controlling, by the controller, an electrical load disconnect relay in response to the operating power condition.

10. The fuel power transfer system of claim 8, wherein the sensor includes a first fuel pressure sensor in fluid communication with the first discharge port and a second fuel pressure sensor in fluid communication with the second discharge port, wherein the operations further comprise:

receiving, by the controller, a primary discharge port pressure and a secondary discharge port pressure; and determining, by the controller, the operating power condition or the intermediate operating power condition based on the primary discharge port pressure and the secondary discharge port pressure.

* * * * *